United States Patent
Selekman et al.

(10) Patent No.: US 10,394,831 B2
(45) Date of Patent: Aug. 27, 2019

(54) PROFILE WITH THIRD-PARTY CONTENT

(71) Applicant: Facebook, Inc., Menlo Park, CA (US)

(72) Inventors: Aryeh Selekman, San Francisco, CA (US); Aigerim Shorman, San Francisco, CA (US); Jeffrey Huang, Mountain View, CA (US); Tony Chun-Hao Hsieh, San Mateo, CA (US); Aaron David Carambula, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 265 days.

(21) Appl. No.: 15/172,712

(22) Filed: Jun. 3, 2016

(65) Prior Publication Data
US 2017/0351680 A1 Dec. 7, 2017

(51) Int. Cl.
*G06F 7/00* (2006.01)
*G06F 16/2457* (2019.01)
*H04L 29/08* (2006.01)
*G06F 16/248* (2019.01)
*G06Q 30/02* (2012.01)
*G06Q 50/00* (2012.01)
*G06F 16/9535* (2019.01)

(52) U.S. Cl.
CPC ...... *G06F 16/24578* (2019.01); *G06F 16/248* (2019.01); *G06F 16/9535* (2019.01); *G06Q 30/0207* (2013.01); *G06Q 30/0241* (2013.01); *G06Q 50/01* (2013.01); *H04L 67/02* (2013.01); *H04L 67/306* (2013.01)

(58) Field of Classification Search
CPC .......... G06F 17/3053; G06F 17/30554; G06F 9/4451; G06F 17/30029; G06F 17/30699; G06F 17/30702; G06F 17/30761; G06F 17/30828; H04L 67/306; H04L 67/02
USPC .................. 707/733, 723, 734, 784, 999.003
See application file for complete search history.

(56) References Cited

U.S. PATENT DOCUMENTS

| 8,719,347 | B1 * | 5/2014 | Tomkins | G06F 17/30041 |
| | | | | 709/204 |
| 8,832,132 | B1 * | 9/2014 | Spertus | G06F 17/30867 |
| | | | | 707/765 |
| 9,171,287 | B2 * | 10/2015 | Sorg | G06Q 50/01 |
| 9,247,199 | B2 * | 1/2016 | Lee | H04N 7/141 |

(Continued)

OTHER PUBLICATIONS

U.S. Appl. No. 15/172,602, filed Jun. 3, 2016, Selekman.
U.S. Appl. No. 15/173,131, filed Jun. 3, 2016, Selekman.
U.S. Appl. No. 15/173,208, filed Jun. 3, 2016, Selekman.

*Primary Examiner* — Mohammed R Uddin
(74) *Attorney, Agent, or Firm* — Baker Botts L.L.P.

(57) ABSTRACT

In one embodiment, a method includes receiving an input corresponding to a search query from an online page of a social-networking system. The online page corresponds to a target user of the social-networking system. The method also includes identifying one or more of a number of content objects associated with the target user. The association is based at least in part on analyzing text, audio, or visual content of each of the plurality of content objects as well as interactions by the target user with each of the plurality of content objects. The method also includes scoring each of the identified content objects based at least in part on an affinity score of the content object relative to a querying user; and ranking each of the identified content objects based at least in part on the affinity score.

20 Claims, 16 Drawing Sheets

(56) References Cited

U.S. PATENT DOCUMENTS

| | | | | |
|---|---|---|---|---|
| 9,438,646 B2* | 9/2016 | Andler | ............... | H04L 65/403 |
| 9,448,682 B2* | 9/2016 | Yerli | ............... | G06F 3/048 |
| 9,633,119 B2* | 4/2017 | Wexler | ............... | G06F 17/30867 |
| 9,753,923 B2* | 9/2017 | Fleischman | ............... | G06F 17/30017 |
| 2007/0214121 A1* | 9/2007 | Ebanks | ............... | G06F 17/30867 |
| 2008/0040475 A1* | 2/2008 | Bosworth | ............... | G06Q 30/08 709/224 |
| 2009/0282144 A1* | 11/2009 | Sherrets | ............... | G06Q 30/02 709/224 |
| 2009/0307168 A1* | 12/2009 | Bockius | ............... | G06F 17/30867 706/46 |
| 2010/0153832 A1* | 6/2010 | Markus | ............... | G06F 17/30958 715/205 |
| 2011/0004831 A1* | 1/2011 | Steinberg | ............... | H04N 21/454 715/753 |
| 2011/0196855 A1* | 8/2011 | Wable | ............... | G06F 17/30631 707/711 |
| 2011/0320441 A1* | 12/2011 | Lee | ............... | G06F 17/30867 707/723 |
| 2012/0166433 A1* | 6/2012 | Tseng | ............... | H04W 4/21 707/728 |
| 2012/0166452 A1* | 6/2012 | Tseng | ............... | G06F 17/30867 707/749 |
| 2013/0073280 A1* | 3/2013 | O'Neil | ............... | G06F 17/2881 704/9 |
| 2013/0086078 A1* | 4/2013 | Malleshaiah | ............... | G06Q 30/02 707/748 |
| 2013/0332523 A1* | 12/2013 | Luu | ............... | G06Q 30/0251 709/204 |
| 2014/0006977 A1* | 1/2014 | Adams | ............... | H04L 51/32 715/758 |
| 2014/0068459 A1* | 3/2014 | Graham | ............... | G06Q 50/01 715/753 |
| 2014/0181086 A1* | 6/2014 | Wable | ............... | G06F 17/3064 707/722 |
| 2014/0244744 A1* | 8/2014 | Lyren | ............... | G06Q 50/01 709/204 |
| 2014/0280214 A1* | 9/2014 | Han | ............... | G06F 17/30943 707/748 |
| 2014/0280548 A1* | 9/2014 | Langlois | ............... | H04L 67/22 709/204 |
| 2015/0248481 A1* | 9/2015 | Sundaresan | ............... | G06F 17/30864 707/723 |
| 2017/0124086 A1* | 5/2017 | Feng | ............... | G06F 17/3053 |
| 2017/0242898 A1* | 8/2017 | Su | ............... | G06F 17/30554 |

* cited by examiner

```
Created: Apr 13, 2015
Photo ID: 101020365800059111
Score: 2.48

[number of likes]
    [value] -> 114
    [score] -> 2.06

[number of tags]
    [value] -> 2
    [score] -> 1

[is cover photo]
    [value] -> 1
    [score] -> 0.75

[has person]
    [value] -> 0.947
    [score] -> 0.710

[nature]
    [value] -> 0.779
    [score] -> 0.584
```

PROFILE WITH THIRD-PARTY CONTENT

TECHNICAL FIELD

This disclosure generally relates to online pages on a social-networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks, content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a social-networking system may infer various interests of a user has based on analyzing content objects associated with the user or the user's interaction with the content objects. For example, images associated with the user may be analyzed to detect features (e.g., a dog, activity, or landmarks) of the images. Interests (e.g., hobbies, causes, or themes) of the user may be inferred based on the detected features. In particular embodiments, an online page of the user may be modified to incorporate content related to the inferred interest of the user.

In particular embodiments, the social-networking system may provide information to display an online page of the user with page elements that includes content from or a functionality supported by a third-party system. In particular embodiments, the social-networking system may authenticate the user to third-party account of the user registered with a third-party system. The social-networking system may analyze content objects associated with the user or the user's interaction with the content objects on the third-party system. In particular embodiments, the page elements may be based on the analysis of the content objects or interactions with content objects on the third-party system. For example, the online page of the user may include an image associated with the user from an account registered with the third-party system. As another example, the online page of the user may include a link to a profile page of the user that is supported by a third-party system.

In particular embodiments, the social-networking system may provide a curated online page of a target user. In particular embodiments, a querying user may select the query field of an online page of a target user and the user interface may display a search-results page of target user with contextual or ranked content. For example, the search-results page may search results that include public content of the target user. In particular embodiments, the search results of the search-results page may be scored based at least in part on an affinity score of the content relative to the querying user. Furthermore, the content may be ranked based on the affinity score.

In particular embodiments, the social-networking system may provide for display posts not previously viewed by a user of the online social network. In particular embodiments, the social-networking system identifies friends that are associated with content not previously viewed by the user. Information identifying the friends associated with content not previously viewed by the user may be provided to a client system of the user. In particular embodiments, the social-networking system may receive an input selecting one of the identified friends and provide an online page associated with the selected friend that incorporates content not previously viewed by the user. For example, a profile page of the selected friend may have a "new" posts section that includes posts that have not been previously viewed by the user.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
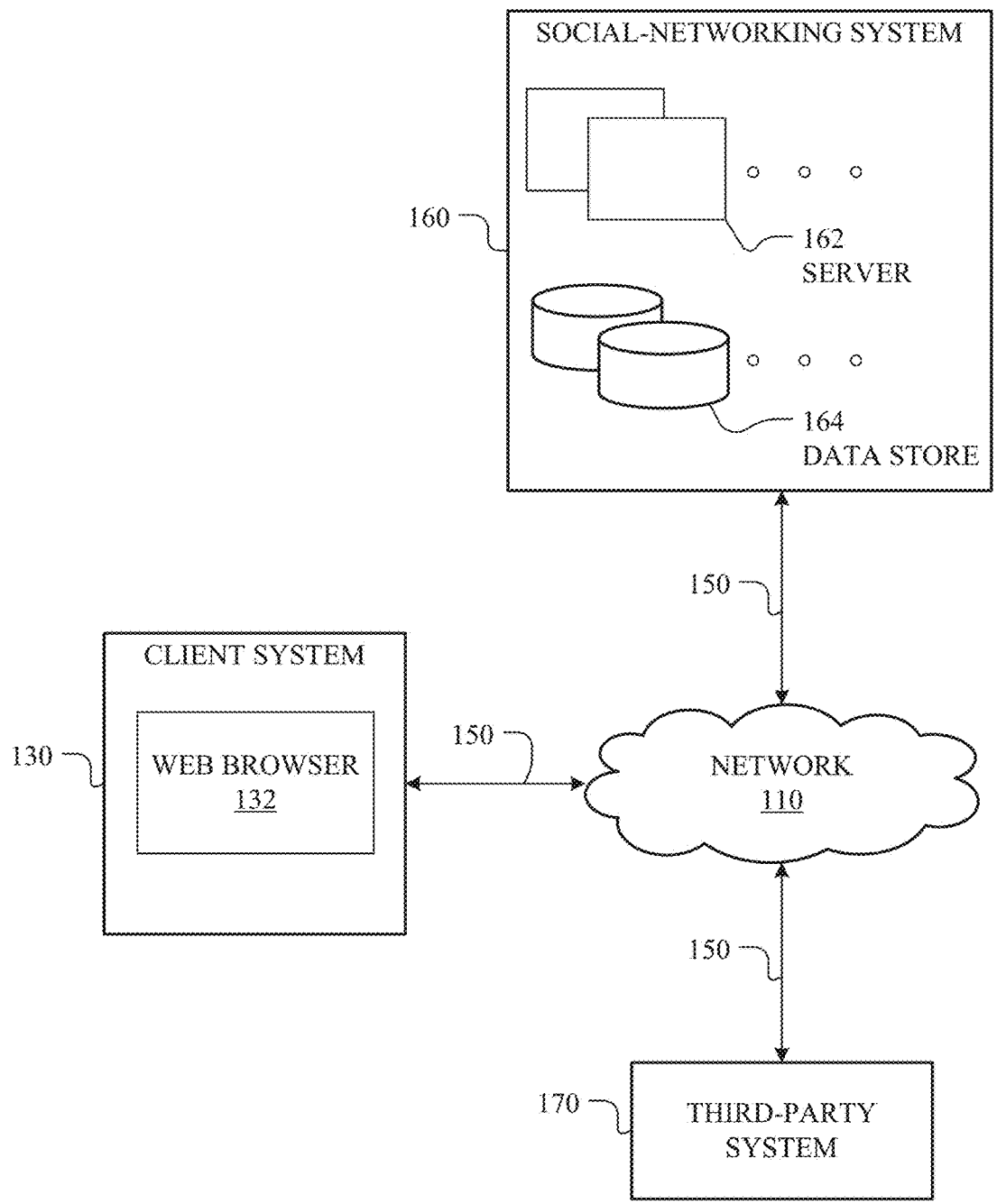
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user of client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to the server. The server may accept the HTTP request and communicate with client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet. As an example and not by way of limitation, social-networking system 160 may provide a set of authentication APIs to third-party systems 170 (e.g., websites or applications) enabling users to gain access their third-party registered on third-party systems 170 using their credentials for social-networking system 160.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, content or data objects ("objects") stored on data store 164 of social-networking system 160 may correspond to a particular node of a social graph. An edge connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of data store 164 based on newly received objects, and relationships associated with the received objects.

In particular embodiments, data store 164 may be configured to store objects of a particular object-types in a respective data storage device. As an example and not by way of limitation, an object-type may be a user, a photo, a post, a comment, a message, an event listing, a webpage, an application, a location, a user-profile page, a concept-profile page, a user group, an audio file, a video, an offer/coupon, or other suitable type of object. Although this disclosure describes particular types of objects, this disclosure contemplates any suitable types of objects. User objects stored in data store 164 may include an identifier (e.g., a character string), a user name, or a profile picture for a user of the online social network. Social-networking system 160 may also store in data store 164 information associated with a user object such as language, location, education, contact information, interests, relationship status, a list of friends/contacts, a list of family members, privacy settings, and so on. As an example and not by way of limitation, post objects may include an identifier that may be, for example, a text string for a post posted to social-networking system 160. Social-networking system 160 may also store in the post information associated with a post object such as a time stamp, an author, privacy settings, users who like the post, a count of likes, comments, a count of comments, location, and so on. As another example, a photo object (or objects of other media types such as video or audio) may include an identifier and a photo. Social-networking system 160 may also store information associated with a photo object such as a time stamp, an author, privacy settings, users who are tagged in the photo, users who like the photo, comments, and so on. In particular embodiments, data store 164 may also be configured to store information associated with each stored object.

In particular embodiments, objects stored in data store 164 may be indexed by one or more search indices and the search indices may be updated based on data (e.g., a photo and information associated with a photo) submitted to social-networking system 160 by users or other processes of social-networking system 160 (or a third-party system). The search indices may also be updated periodically (e.g., every 24 hours). Social-networking system 160 may receive a query that includes a search term, and access and retrieve search results from one or more search indices corresponding to the search term. A search engine may conduct a search based on the query phrase using various search algorithms and generate search results that identify resources or content (e.g., user-profile pages, content-profile pages, or external resources) that are most likely to be related to the search query. The identified content may include, for example, social-graph elements (i.e., user nodes, concept nodes, edges), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate.

The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Figure 2:
FIG. 2 illustrates an example analysis of a content object.

FIG. 2 illustrates an example analysis of a content object. In particular embodiments, social-networking system 160 may access one or more content objects of a user and may infer objects that are representative of various interests of a user. As an example and not by way of limitation, social-networking system 160 may infer one or more interests of the user based on identifying subject matter or interactions by the user with one or more content objects. As an example and not by way of limitation, the content objects associated with the user may include a post that includes a content object (e.g., an image) submitted by the user, a post submitted by a friend of the user that includes the content object, a post including a content object that "tags" the user, an indication of the user sentiment submitted by the user in relation to the content object (e.g., a "like" or comment), an indication of a location associated with the content object (e.g., check-in), or an indication relating to an event associated with the content object (e.g., calendar object).

In particular embodiments, the subject matter of a content object may be identified based on identifying one or more features in the content object, such as for example people, objects, locations, date, time, text, music, or sounds. In particular embodiments, the interests of the user may be inferred from content objects indexed by various search indices for a type of content object (e.g., books, movies, TV shows, music), described above. In particular embodiments, images associated with a user that are stored on social networking system 160 may be analyzed using an object-detection algorithm. As an example and not by way of limitation, the object-detection algorithm may compare features of images associated with the user with features of objects stored in an object database using frequency-domain image processing, filtering, wavelet analysis, feature extraction, machine-learning algorithms such as neural networks, texture recognition, or any suitable object-detection algorithm. In particular embodiments, the object-detection algorithm automatically recognizes signs as a particular class of object, and applies optical character recognition (OCR) to convert signage into searchable text. As an example and not by way of limitation, object detection may be performed on one or more frames of a video file. For example, social-networking system 160 may analyze photos of the user, and extract information based on features (e.g., a dog, activity, or landmarks) of the photos.

In particular embodiments, social-networking system 160 may store audio waveforms or audio waveform fingerprints for various songs, television shows, soundtracks, movies, or musical performances in an audio database. Audio captured by a client system 130 of the user may be captured through a microphone as part of a video or a discrete audio recording. In particular embodiments, the audio captured by client devices 130 may be transformed into an audio fingerprint that may be compared with waveform fingerprints in stored in the audio database. In particular embodiments, waveform matching application utilizes feature detection using Fast Fourier Transforms (FFTs) or Direct Cosine Transforms (DCTs). In particular embodiments, cross correlation in either the frequency or time domain may be utilized for waveform matching. This disclosure contemplates any suitable method or algorithm for waveform or waveform fingerprint matching.

In particular embodiments, social-networking system 160 may analyze the interactions by the user with regard to a content object associated with the user. As an example and not by way of limitation, the interactions by the user may include a posting a comment on a post, submitting a visual representation of an emotion (e.g., "emoji") in a comment, "liking" a post, re-sharing a post, "follow", a check-in at a location, tagging an object, or accepting an event object. For example, a user may comment on a post about snowboarding and the comment may further include a "smiley" emoji. As another example, the user may share a post about snowboarding or tag himself or other users in an image of people snowboarding. As yet another example, the user may perform a check-in or accept an event at a snow park.

In particular embodiments, social-networking system 160 may analyze a content object or interactions by the user with regard to a content object on a third-party system 170. As an example and not by way of limitation, social-networking system 160 may analyze contacts, images, videos, posts, or blogs that are stored or hosted third-party systems 170 where the user is authenticated using the authentication APIs described above. As another example, interactions by the user on third-party systems 170 may include listening to a song, playing an online game, viewing a video, posting a video, sharing an image, commenting on a group post, sharing an article, or accepting an event.

Sentiment analysis of a user may be performed by classifying the "polarity" of a given text with regard to a content object. As an example and not by way of limitation, at a document, sentence, or feature/aspect level—whether the text in a document, a sentence or an entity feature/aspect may be classified as being positive, negative, or neutral. In addition, sentiment classification may further classify text into more subtle emotional states such as example, "angry," "sad," and "happy." As an example and not by way of limitation, knowledge-based techniques classify text by affect categories based on the presence of unambiguous affect words such as happy, sad, afraid, or bored. Sentiment analysis of content objects may be performed using polarity classification, sentiment classification according to a pre-defined set of emotional states, subjectivity/objectivity identification, or feature/aspect-based sentiment analysis. In particular embodiments, sentiment analysis of content objects may be based upon, not just words, punctuation, and ideogram usage, but also other indicia, such as, by way of example and not limitation: (1) analysis of audio including a voice to detect volume, tone, and/or inflection, (2) analysis of video to perform facial/gesture recognition and emotion detection, and/or (3) analysis of biometric sensor data to detect pulse, temperature, skin conductance, pressure and/or speed while typing/clicking on a touchscreen, and/or pupil constriction/dilation.

In particular embodiments, social-networking system 160 may infer a particular interest (e.g., hobbies, causes, or themes) of the user based on the analysis text, audio, or visual content of each of the content objects as well as any interactions by the user, as described above. For example, social-networking system 160 may infer a user is interested in snowboarding based on the user "liking" a particular brand of snowboard, posting a number of snowboarding photos, a "check-in" at a ski resort location (e.g., Lake Tahoe, Calif. or Park City, Utah), or posts of the user that mention snowboarding. In particular embodiments, a relevance score for the accessed content objects may be calculated based on the analysis of the accessed content objects. As illustrated in the example of FIG. 2, the text, audio, visual content, or interactions of an example content object 210 may be analyzed based on one or more criteria. An example scoring 220 of content object 210 may be based on interactions of users (e.g., number of tags or likes) as well as subject matter of content object 210 (e.g., whether the user is present in an image or an image is a nature image). In particular embodiments, the relevance score may be a weighted score based on the various criteria.

Figures 3, 4:
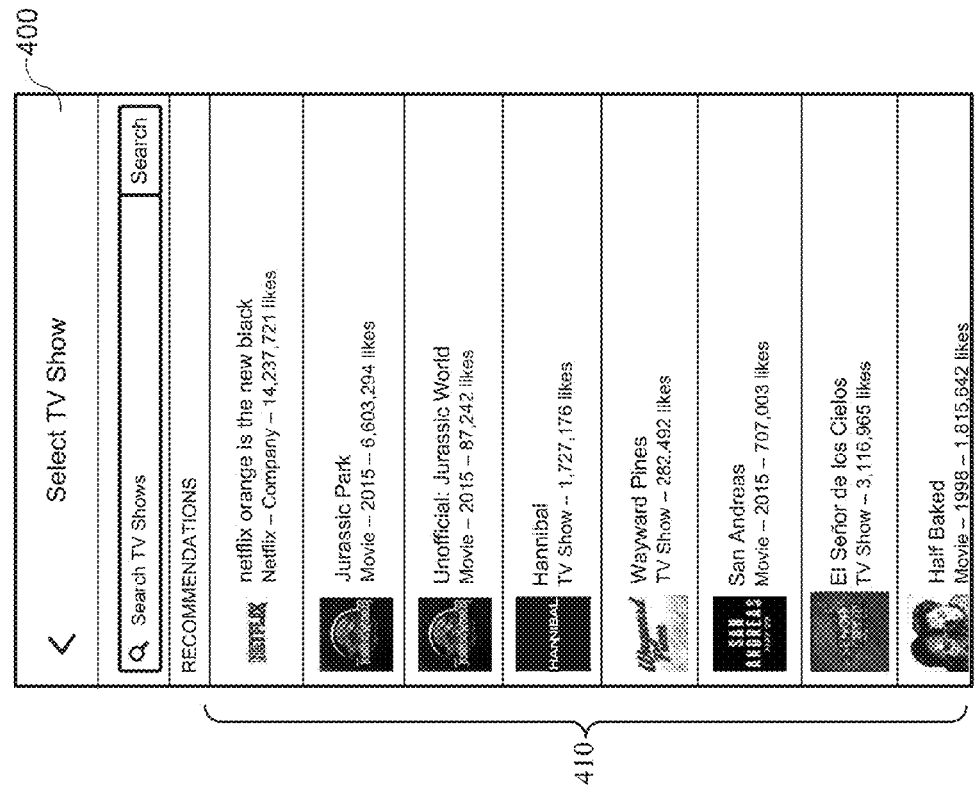
FIGS. 3-6 illustrate example user interfaces (UIs) for modifying an online page based on inferred interests of a user.

FIGS. 3-6 illustrate example user interfaces (UIs) for modifying an online page based on inferred interests of a user. Social-networking system 160 may provide recommendations to personalize one or more online pages. As illustrated in the example of FIG. 3, a UI 300 may include recommendations of interest that are organized into categories 310. As an example and not by way of limitation, categories 310 may include books, music, movies, television shows, sports, organizations, or places. In addition, UI 300 may also include a query field 320 that may be used to search through the recommendations. As illustrated in the example of FIG. 4, UI 400 may provide one or more recommendations 410 that correspond to a selected category 310 of recommendations 410. In particular embodiments, recommendations 410 may be identified based on the subject matter or user sentiment related to one or more content objects associated with a user. For example, a user may be provided a number of recommendations 410 corresponding to particular television shows based on the user liking a post related to the television show or posting a comment with a positive sentiment related to the television show. In particular embodiments, recommendations 410 may be based on activity of the user on an account registered on one or more third-party systems 170. Recommendations 410 may include content objects corresponding to contacts, images, videos, games, blogs, movies, television shows hosted on third-party systems 170. For example, recommendations 410 may correspond to a song or music group that the user listened to on a music-streaming site, an online game that the user played on an online-game site, or a television show or movie watched on a movie-streaming site. In particular embodiments, each of recommendations 410 has a relevance score higher than a pre-determined threshold value.

Figures 5, 6:
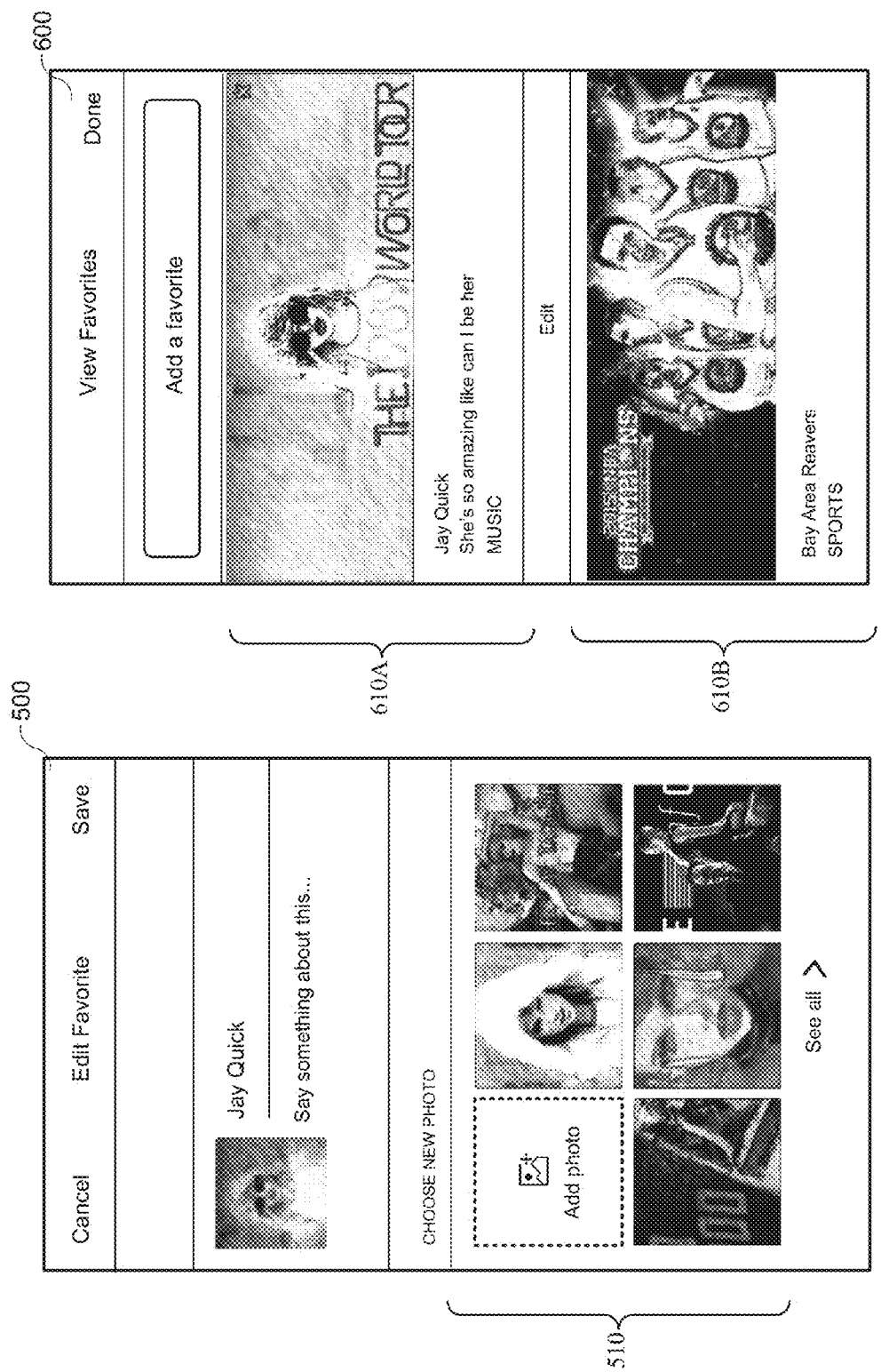

As illustrated in the example of FIG. 5, UI 500 may allow the user to edit or tailor the content corresponding to an inferred interest for an online page (e.g., profile page) of the user. As an example and not by way of limitation, a tagline associated with the inferred interest may be added or edited. One or more images 510 corresponding to the inferred interest may be selected to be added to the online page of the user. In particular embodiments, one or more images 510 may be identified through analysis of text, audio, or visual content of the user (e.g., a shared image) or interactions by the user (e.g., liking a particular image). In particular embodiments, one or more images 510 may be identified through the interactions of the user with content objects on third-party systems 170 (e.g., cover art corresponding to a song performed by a particular musical group). In particular embodiments, content 610A-B corresponding to inferred interests may be added to or removed from an online page of the user through UI 600, as illustrated in the example of FIG. 6.

Figure 7:
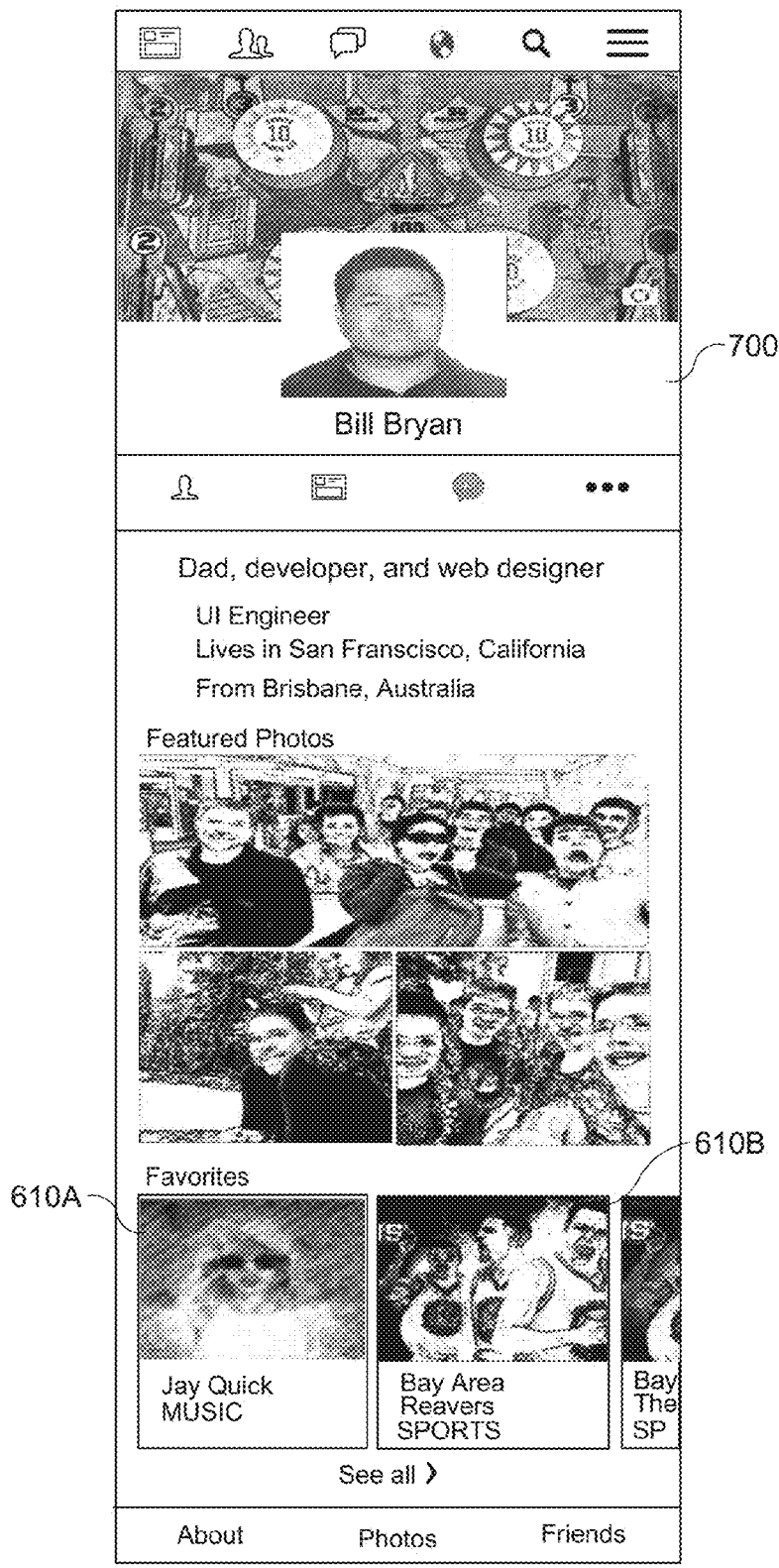
FIG. 7 illustrates an example online page incorporating content related an inferred interest of a user.

FIG. 7 illustrates an example online page incorporating content related an inferred interest of a user. In particular embodiments, an online page 700 of the user (e.g., profile page) may be modified to incorporate content 610A-B related to one or more of the inferred interests of the user, as illustrated by the example of FIG. 7. In particular embodiments, the relevance score for content 610A-B modifying online page 700 may be adjusted based on an associated portion of online page 700. As an example and not by way of limitation, nature images may have a higher relevance score for background photo recommendations based on the user posting articles about hiking. As another example, online page 700 may be modified to include an image that represents snowboarding (e.g., a photo of the user snowboarding) as a "Featured Photo" portion of online page 700 or other information on their profile page (e.g., "About" portion of online page 700). In particular embodiments, content 610A-B modifying online page 700 may be or include a page element such as, for example, content provided by third-party system 170 or an interactive element (e.g., a hyperlink ("link")) incorporating functionality supported by third-party system 170. As an example and not by way of limitation, content 610A-B may include a link to watch a video hosted on a particular third-party system 170. As another example, content 610A-B may be a profile photo corresponding to a contact or friend of the user from third-party system 170.

Figure 8:
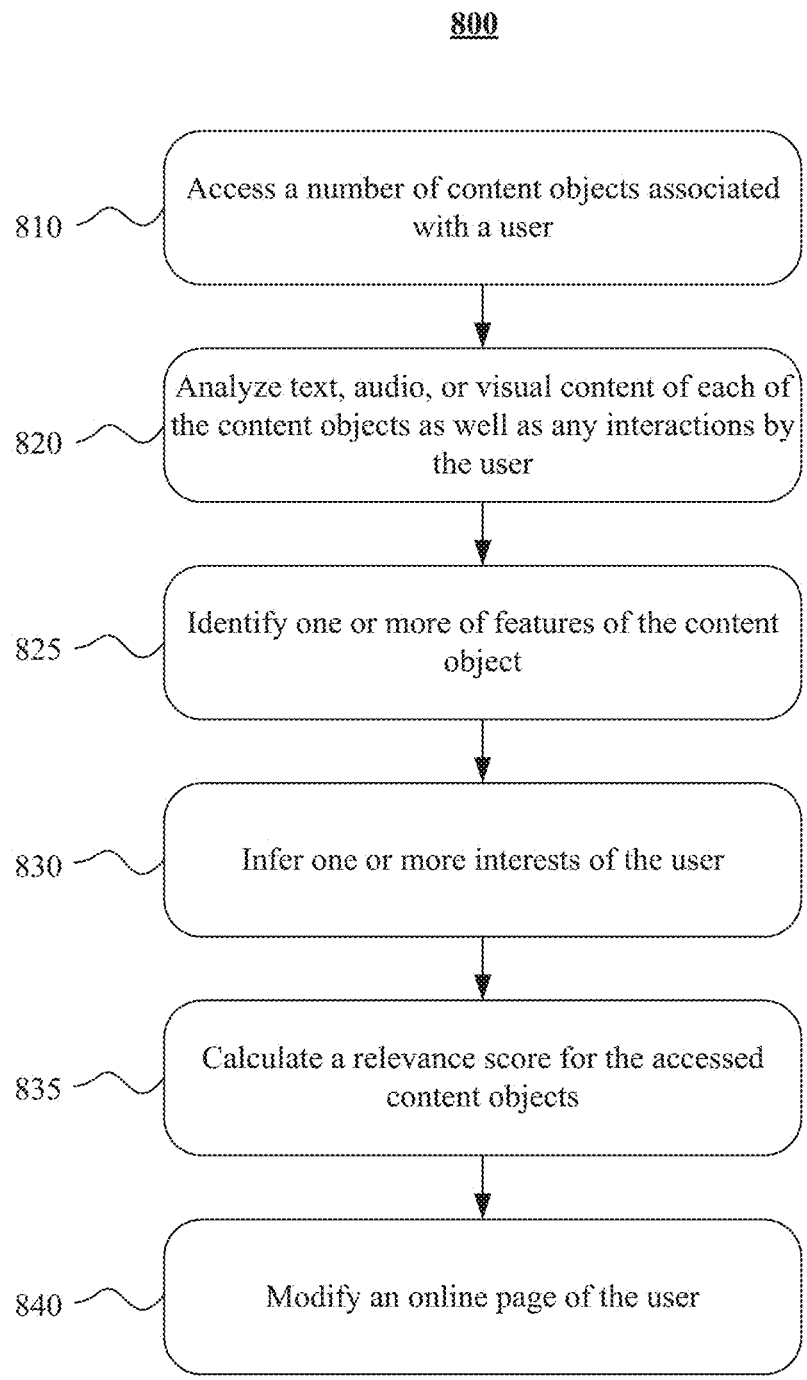
FIG. 8 illustrates an example method for modifying an online page of a user.

FIG. 8 illustrates an example method 800 for modifying an online page of a user. The method may begin at step 810, where social-networking system 160 may access a plurality of content objects associated with a user. At step 820, social-networking system 160 may analyze text, audio, or visual content of each of the content objects as well as any interactions by the user with each of the content objects. In particular embodiments, the analysis may include identifying subject matter and user sentiment related to the content objects. At step 825, social-networking system 160 may identify one or more features in the content object. In particular embodiments, the features may include people, objects, locations, date, time, text, music, or sounds associated with the content object. At step 830, social-networking system 160 may infer, based on the identified subject matter or user sentiment, one or more interests of the user. At step 835, social-networking system 160 may calculate a relevance score for the accessed content objects based on the analysis of the accessed content objects. At step 840, social-networking system 160 may modify, for display on a client system 130, an online page of the user to incorporate content related to one or more of the inferred interests of the user. Particular embodiments may repeat one or more steps of method 800 of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for modifying an online page of a user, including the particular steps of the method of FIG. 8, this disclosure contemplates any suitable method for modifying an online page of a user including any suitable steps, which may include all, some, or none of the steps of the method of FIG. 8, where appropriate. Furthermore, although this disclosure describes and illustrates particular components, devices, or systems carrying out particular steps of the method of FIG.

8, this disclosure contemplates any suitable combination of any suitable components, devices, or systems carrying out any suitable steps of the method of FIG. 8.

Figure 9:
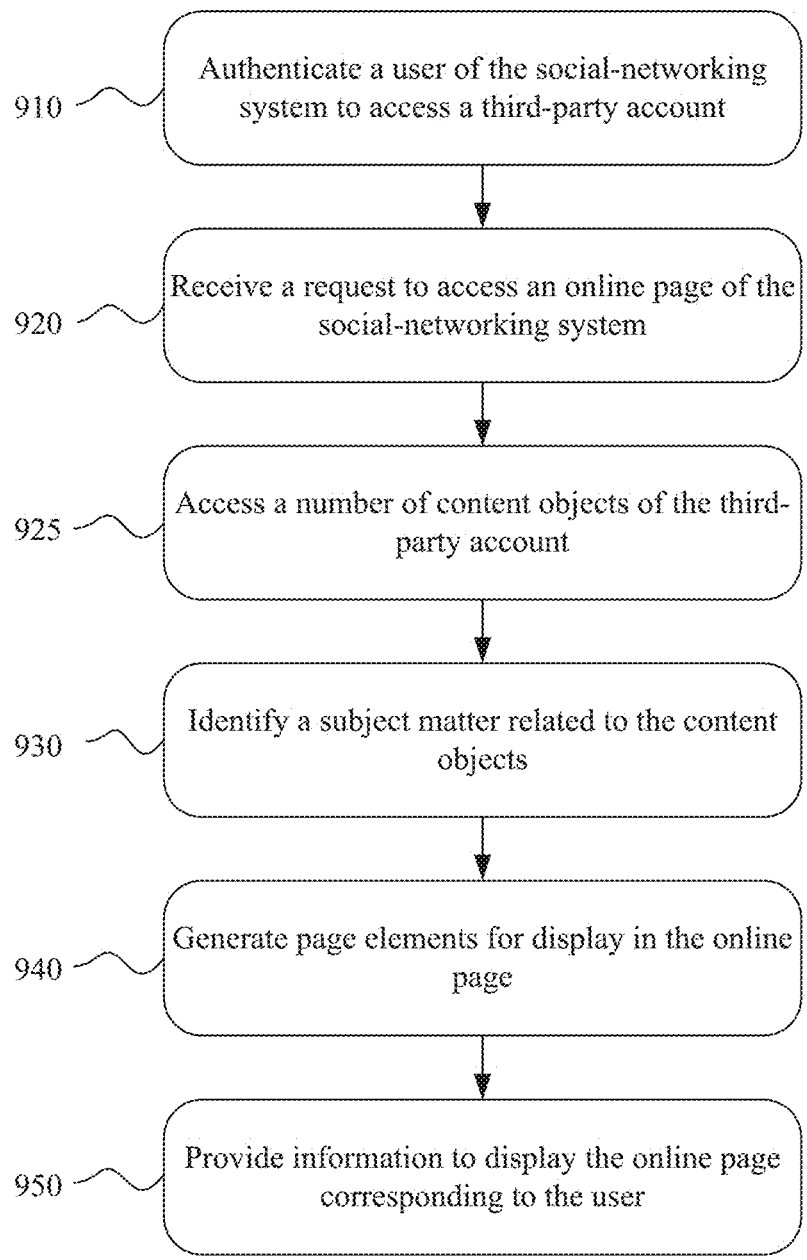
FIG. 9 illustrates an example method for modifying an online page of a user with content from a third-party system.

FIG. 9 illustrates an example method 900 for modifying an online page of a user with content from a third-party system. The method may begin at step 910, social-networking system 160 may authenticate a user of the social-networking system to access a third-party account of the user registered with a third-party system. At step 920, social-networking system 160 may receive a request to access an online page of social-networking system 160. In particular embodiments, the online page may correspond to the user. At step 925, social-networking system 160 may access a plurality of content objects of the third-party account. At step 930, social-networking system 160 may analyze text, audio, or visual content of each of the accessed content objects as well as any interactions by the user with each of the content objects to identify a subject matter related to the content objects. At step 940, social-networking system 160 may generate one or more page elements for display in the online page. In particular embodiments, each of the one or more page elements may include content provided by the third-party system or an interactive element incorporating functionality supported by the third-party system. At step 950, social-networking system 160 may provide information to display the online page corresponding to the user. Particular embodiments may repeat one or more steps of method 900 of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for modifying an online page of a user with content from a third-party system, including the particular steps of the method of FIG. 9, this disclosure contemplates any suitable method for modifying an online page of a user including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
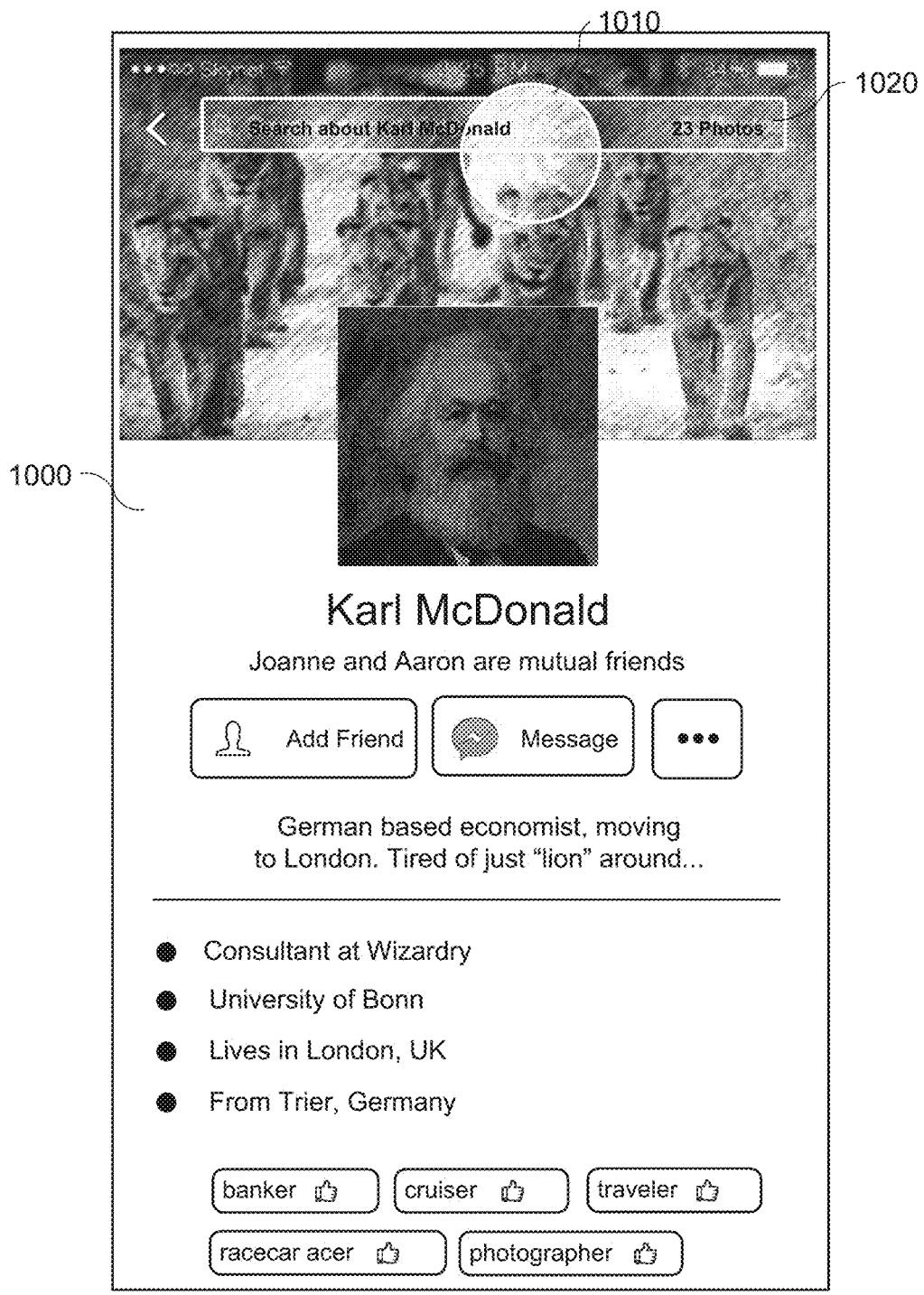
FIGS. 10-11 illustrate example online pages displaying content objects associated with a user.
Figure 11:
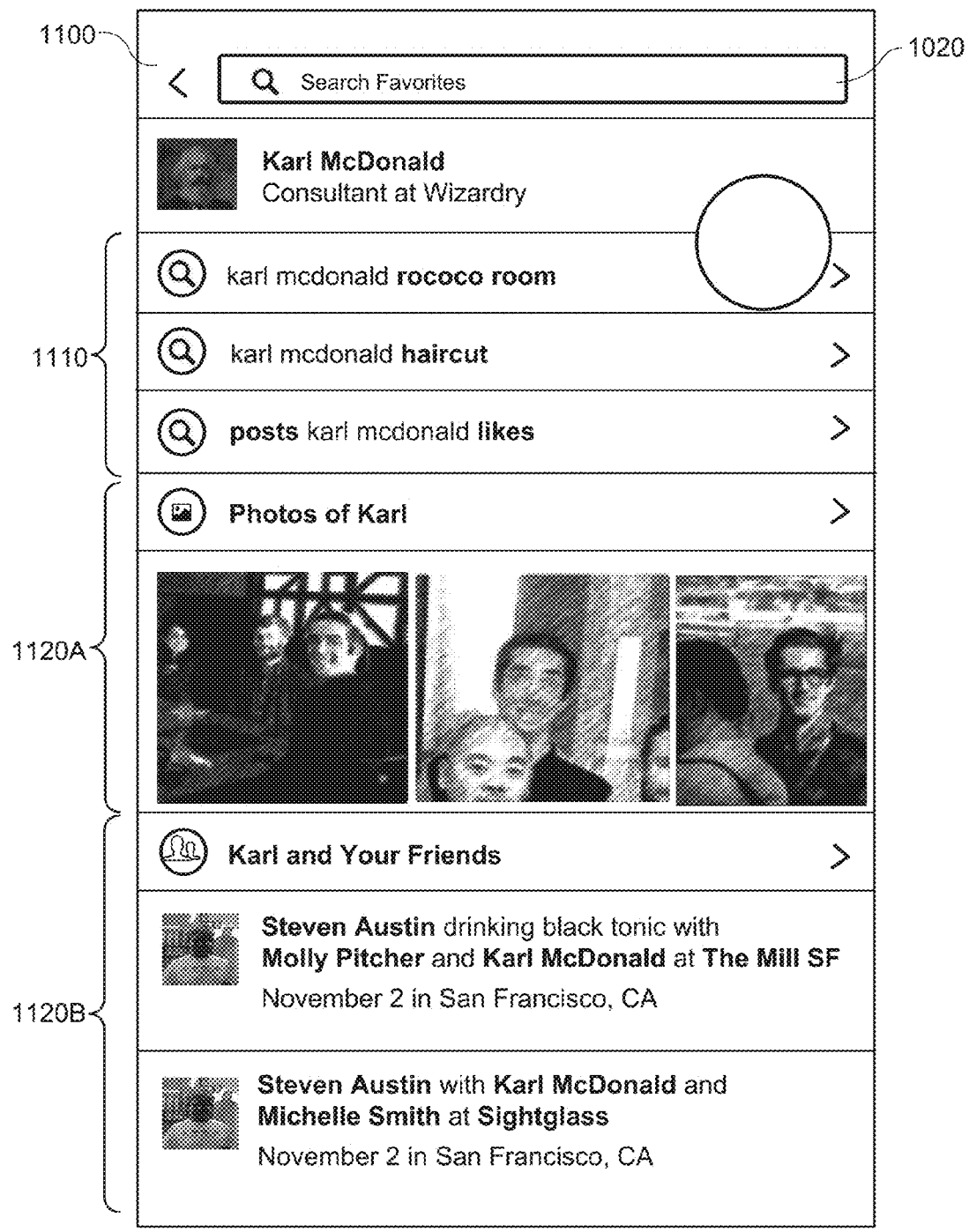

FIGS. 10-11 illustrate example online pages displaying content objects associated with a user. As illustrated in the example of FIG. 10, a query field 1020 of online page 1000 (e.g., profile page) of a target user may be selected through an input 1010. In particular embodiments, the querying user may be presented with an online page 1100 (e.g., search-results page) that includes a list of pre-populated search terms associated with the target user displayed in conjunction with query field 1020, as illustrated in the example of FIG. 11. The search terms may include interests, objects, people, themes, or causes for which the target user is known to have an affinity. In particular embodiments, social-networking system 160 may generate one or more structured search queries 1110 corresponding to the target user. As an example and not by way of limitation, social-networking system 160 may identify content objects associated with the target user based at least in part on analyzing text, audio, or visual content the content objects as well as interactions by the target user with the content objects, as described above. For example, the search-results page may include public content of the target user, such as for example, group posts, events, articles shared, "liked", or commented on by the user, photos that may not be included in a public profile page due to privacy settings relative to other users, mutual activity between the querying user and the searched user, objects from third-party networks 170, or context modules 1120A-B. In particular embodiments, the search results of the search-results page may be ranked.

In particular embodiments, online page 1100 of the target user may include one or more context modules 1120A-B that may include one or more objects associated with the target user. As an example and not by way of limitation, context modules 1120A-B may include top stories, photos, pages, or posts that match the structured query corresponding to the target user. In particular embodiments, each object of context module 1120A-B may have an affinity-score relative to the querying user that is higher than a pre-determined threshold score. Context modules 110A-B may include information identifying each grouping of search results (e.g., a title) and one or more objects associated with one of the structured search queries 1110 corresponding to the target user, as illustrated in the example of FIG. 11. In particular embodiments, the search results of online page 1100 may be displayed with an affinity score of the friend for the subject matter of the search result. The search results displayed on online page 1100 may be sorted by an affinity score of the friend for subject matter of the search result. In particular embodiments, the search results of online page 1100 may be displayed in accordance with privacy settings of the target user. The search results of online page 1100 may be displayed with an affinity score of the user for the subject matter of the respective search result.

Figure 12:
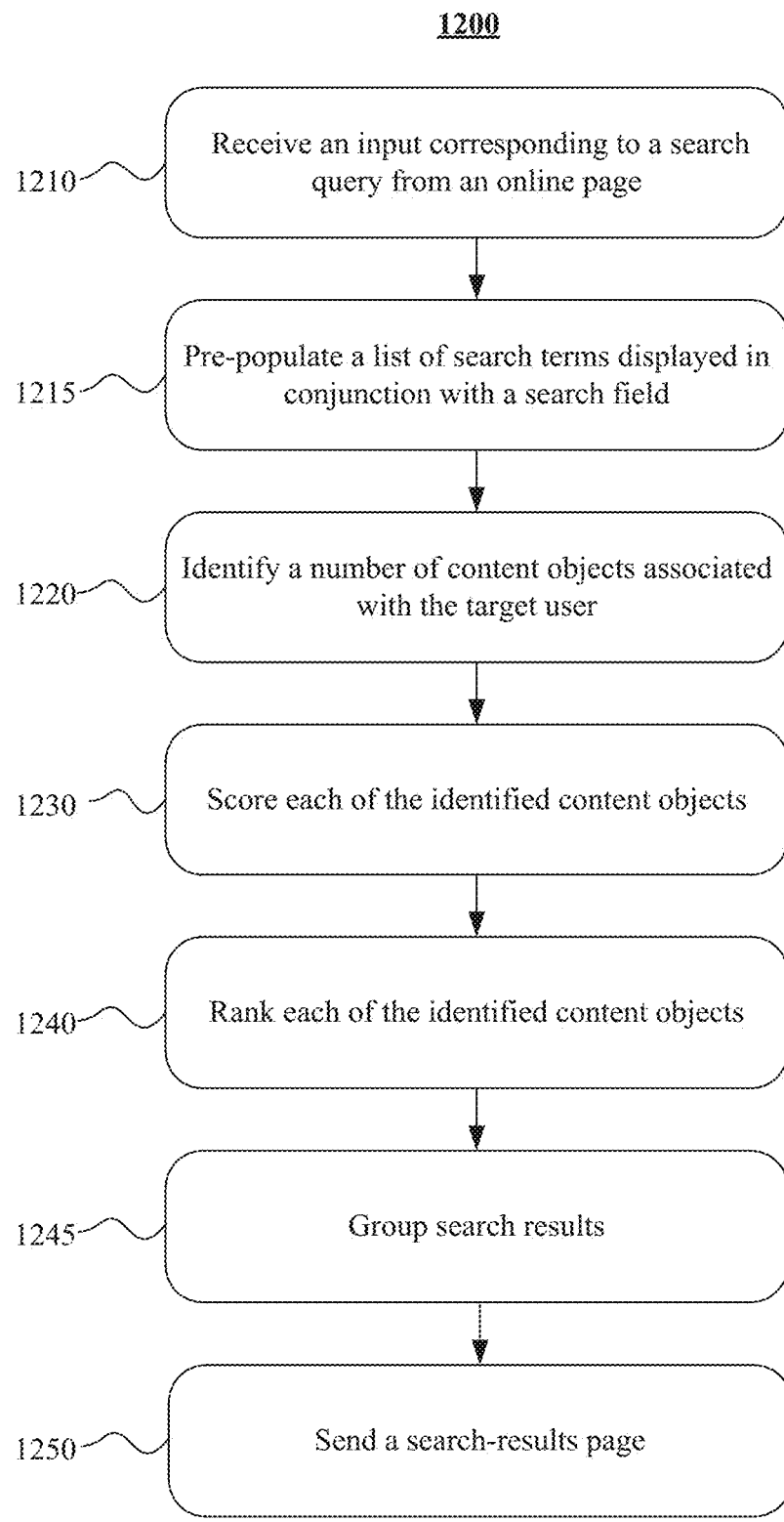
FIG. 12 illustrates example method for providing search results of a user.

FIG. 12 illustrates another example method 1200 for providing search results of a user. The method may begin at step 1210, where social-networking system 160 may receive an input corresponding to a search query from an online page of social-networking system 160. In particular embodiments, the online page corresponds to a target user of social-networking system 160. At step 1215, social-networking system 160 may pre-populate a list of search terms displayed in conjunction with a search field. At step 1220, social-networking system 160 may identify one or more of a number of content objects associated with the target user. At step 1230, social-networking system 160 may score each of the identified content objects. In particular embodiments, the scoring may be based on an affinity score of the content object relative to a querying user. At step 1240, social-networking system 160 may rank each of the identified content objects. At step 1245, social-networking system 160 may group search results based at least in part on a type of ranked content object. At step 1250, social-networking system 160 may send, to a client device of the querying user in response to the received input, a search-results page. In particular embodiments, the search-results page includes one or more search results for display and the search results may reference one or more of the ranked content objects. Particular embodiments may repeat one or more steps of method 1200 of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for providing search results of a user, including the particular steps of the method of FIG. 12, this disclosure contemplates any suitable method for providing search results of a user including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
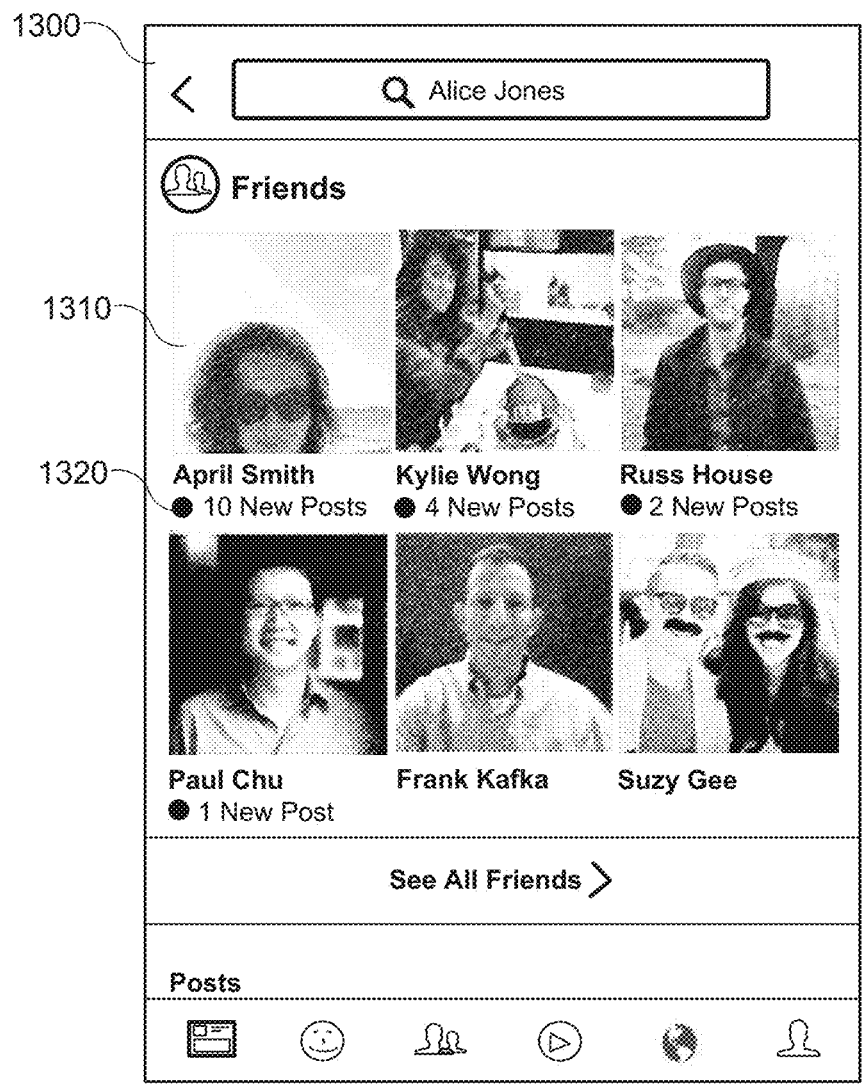
FIGS. 13-15 illustrate example online pages for presenting previously unviewed content of a user.
Figure 14:
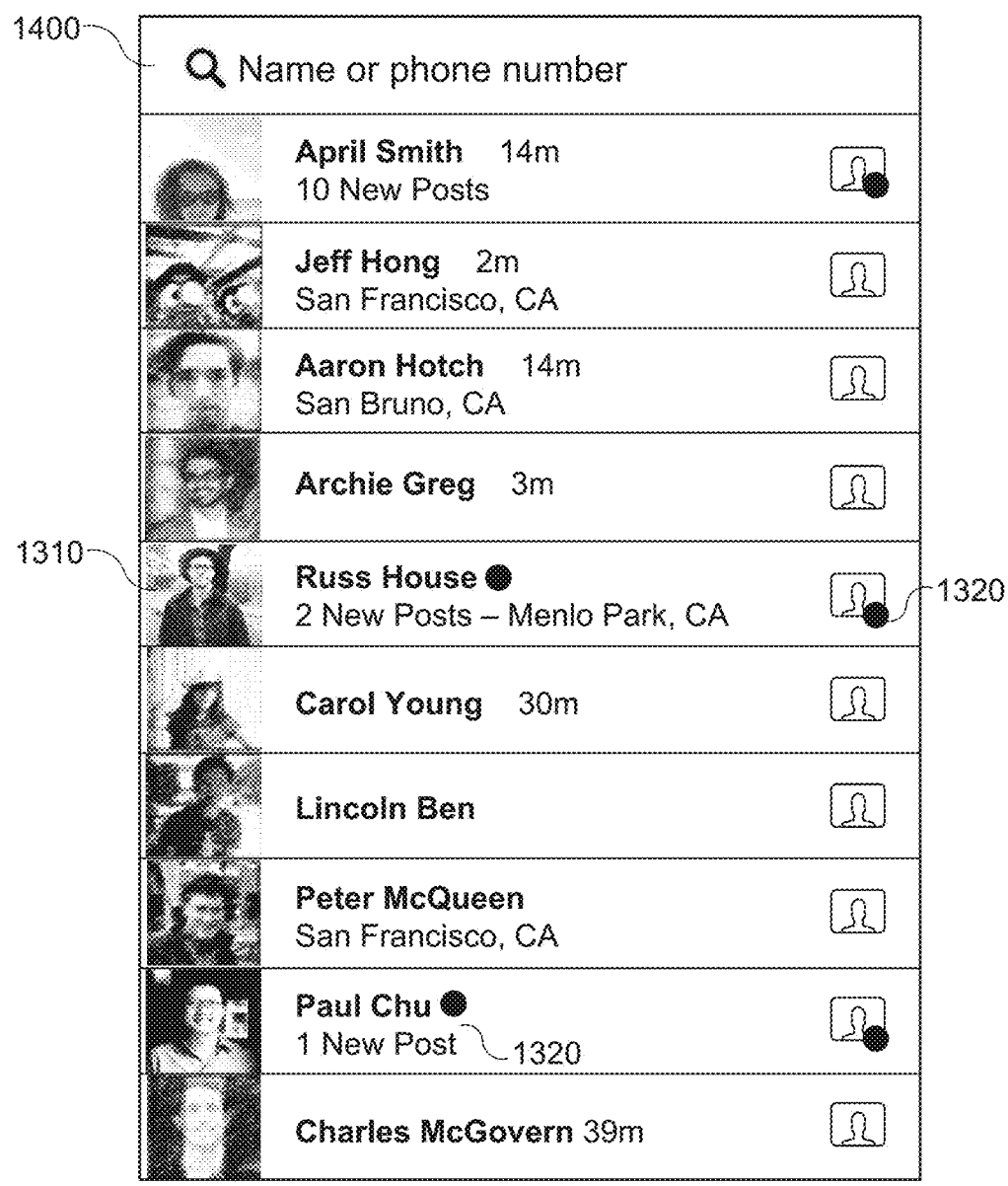
Figure 15:
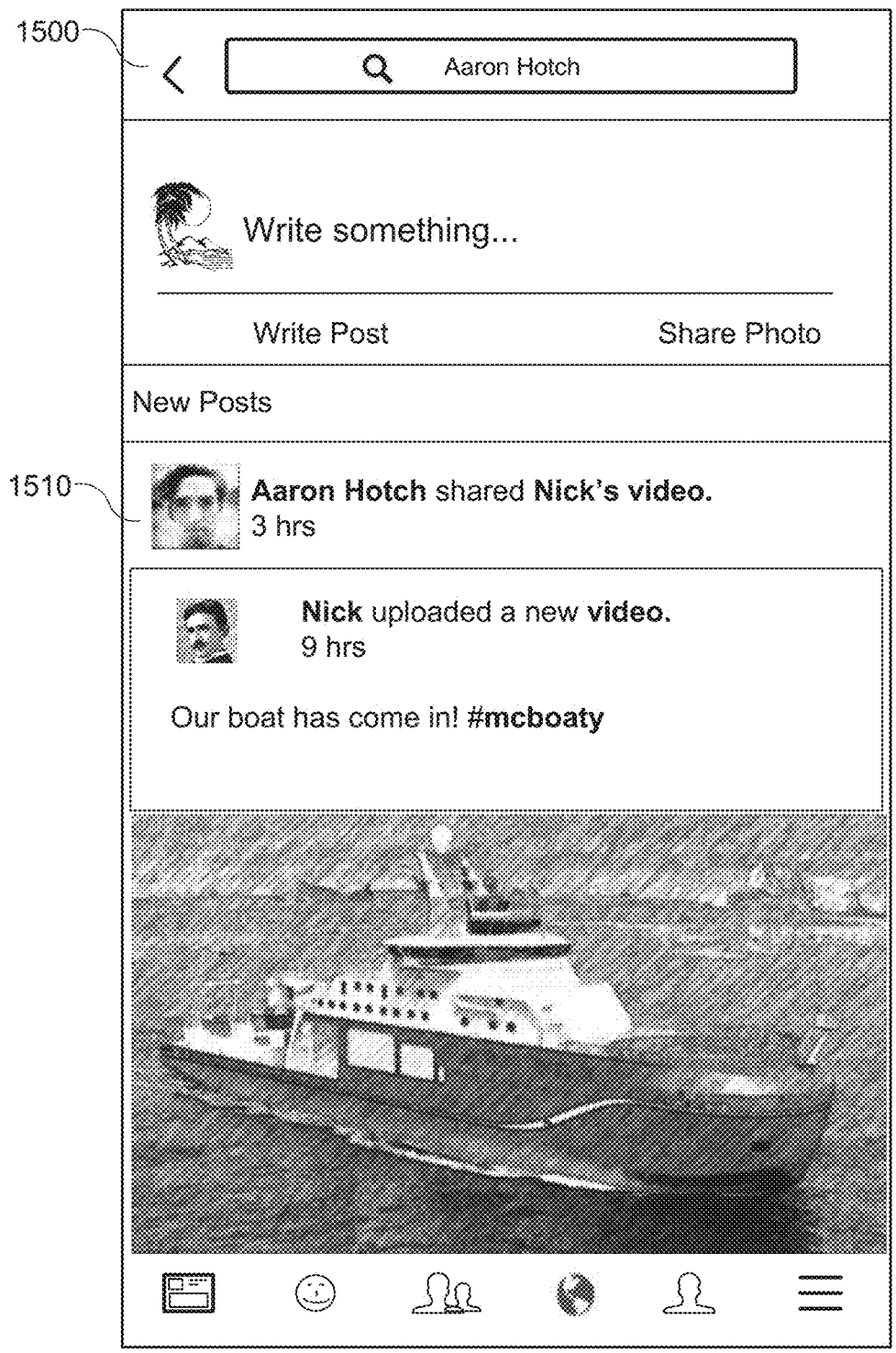

FIGS. 13-15 illustrate example online pages for presenting previously unviewed content of a user. In particular embodiments, content objects (e.g., posts) that have been previously viewed by a user may be tracked across an online page (e.g., profile page or newsfeed) of a friend of the user. As an example and not by way of limitation, an online page 1300 may provide information 1310 identifying friends of a user. As illustrated in the example of FIG. 13, online page 1300 may provide the name or profile picture of one or more friends of the user, along with an indication 1320 that there is a content object not previously viewed by the user. In particular embodiments, a node corresponding to each friend of the user may be connected to a node corresponding the user on a social graph, described below, and friends of the user identified for display on online page 1300 may be based on an affinity, described below, of the friend for the user.

In particular embodiments, another online page 1400 may provide a listing of friends of the user. As an example and not by way of limitation, online page 1400 may provide information 1310 identifying one or more friends of the user, along with an indication 1320 that there is a content object not previously viewed by the user, as illustrated in the example of FIG. 14. As an example and not by way of limitation, indication 1320 that there is content not previously viewed may include a badge or information identifying the particular friend (e.g., profile photo or name). In particular embodiments, the friends of the user may be ranked based on the affinity of each friend for the user. Furthermore, the friends of the user may be displayed on online page 1400 in an order that is based on the ranking.

As illustrated in the example of FIG. 15, an online page 1500 associated with a particular friend of the user may be displayed on client system 130, in response to the user providing an input selecting one or more of the displayed friends (e.g., on online page 1400). As an example and not by way of limitation, the user may tap or click on an area of an online page (e.g., 1400) corresponding to a particular friend of the user. As an example and not by way of limitation, online page 1500 (e.g., profile page or newsfeed of the selected friend) may be modified to include a "new" posts section that includes content 1510 (e.g., posts) that have not been previously viewed by the user. In particular embodiments, content 1510 is associated with a date that is subsequent to the date the user most recently viewed an online page (e.g., newsfeed or profile page) of the selected friend. Content 1510 that has not been previously viewed by the user may be displayed on online page 1500 in a chronological order.

In particular embodiments, some or all of the content not previously viewed by the user may not be shown or suppressed based on a frequency interacts with the particular friend (e.g., frequency of views by the user of the newsfeed or profile page of a particular friend) or the affinity between the user and the particular friend (e.g., suppressed for high values of affinity between the user and the particular friend). As an example and not by way of limitation, content associated with a particular friend may be filtered from being displayed on online page 1500 if the user frequently views the newsfeed or profile page of the particular friend. As another example, the display of online page 1500 or indication 1320 that there is a content object not previously viewed by the user may be suppressed if the user has an affinity with the particular friend that is above a predetermined threshold value.

In particular embodiments, a privacy setting associated with content 1510 not previously viewed by the user may be determined and used to identify content 1510 to be displayed to the user. The privacy settings relative to the user may be approximated and used for privacy checks with regard to content 1510 not previously viewed by the user. In particular embodiments, the privacy settings of friends of the user may cached and used to identify particular content 1510 for display to the user. In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, a third-party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photos albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 404 corresponding to a particular photo may have a privacy setting specifying that the photo may be accessed only by users tagged in the photo and the tagged user's friends. In particular embodiments, privacy settings may allow users to opt in to or opt out of having their content, information, or actions stored/logged by the social-networking system 160 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

Privacy settings associated with an object may specify any suitable granularity of permitted access or denial of access. As an example and not by way of limitation, access or denial of access may be specified for particular users (e.g., only me, my roommates, my boss), users within a particular degrees-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. In particular embodiments, access or denial of access may be specified by time or date. As an example and not by way of limitation, a user may specify that a particular image uploaded by the user is visible to the user's friends for the next week. As another example and not by way of limitation, a company may post content related to a product release ahead of the official launch, and specify that the content may not be visible to other users until after the product launch. In particular embodiments, access or denial of access may be specified by geographic location. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from be sent to the user. In the search-query context, an object may be provided as a search result only if the querying user is authorized to access the object, e.g., the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on an online social network, or other computing system As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users that attend the same university as the first user may view the first user's pictures, but that other users that are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 160 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 160 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, privacy settings may allow a user to specify whether particular applications or processes may access, store, or use particular objects or information associated with the user. The privacy settings may allow users to opt in or opt out of having objects or information accessed, stored, or used by specific applications or processes. The social-networking system 160 may access such information in order to provide a particular function or service to the user, without the social-networking system 160 having access to that information for any other purposes. Before accessing, storing, or using such objects or information, the social-networking system 160 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160. As another example and not by way of limitation, social-networking system 160 may have functionalities that may use as inputs personal or biometric information of the user. A user may opt to make use of these functionalities to enhance their experience on the online social network. As an example and not by way of limitation, a user may provide personal or biometric information to the social-networking system 160. The user's privacy settings may specify that such information may be used only for particular processes, such as authentication, and further specify that such information may not be shared with any third-party system 170 or used for other processes or applications associated with the social-networking system 160. As yet another example and not by way of limitation, an online social network may provide functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to send voice messages, to improve voice recognition in order to use voice-operated features of the online social network), and further specify that such voice recording may not be shared with any third-party system 170 or used by other processes or applications associated with the social-networking system 160.

In particular embodiments, privacy settings may allow a user to specify whether mood or sentiment information associated with the user may be determined, and whether particular applications or processes may access, store, or use such information. The privacy settings may allow users to opt in or opt out of having mood or sentiment information accessed, stored, or used by specific applications or processes. The social-networking system 160 may predict or determine a mood or sentiment associated with a user based on, for example, inputs provided by the user and interactions with particular objects, such as pages or content viewed by the user, posts or other content uploaded by the user, and interactions with other content of the online social network. In particular embodiments, social-networking system 160 may use a user's previous activities and calculated moods or sentiments to determine a present mood or sentiment. A user who wishes to enable this functionality may indicate in their privacy settings that they opt in to social-networking system 160 receiving the inputs necessary to determine the mood or sentiment. As an example and not by way of limitation, social-networking system 160 may determine that a default privacy setting is to not receive any information necessary for determining mood or sentiment until there is an express indication from a user that social-networking system 160 may do so. In particular embodiments, social-networking system 160 may use the predicted mood or sentiment to provide recommendations or advertisements to the user. In particular embodiments, if a user desires to make use of this function for specific purposes or applications, additional privacy settings may be specified by the user to opt in to using the mood or sentiment information for the specific purposes or applications. As an example and not by way of limitation, social-networking system 160 may use the user's mood or sentiment to provide newsfeed items, pages, friends, or advertisements to a user. The user may specify in their privacy settings that social-networking system 160 may determine the user's mood or sentiment. The user may then be asked to provide additional privacy settings to indicate the purposes for which the user's mood or sentiment may be used. The user may indicate that social-networking system 160 may use his or her mood or sentiment to provide newsfeed content and recommend pages, but not for recommending friends or advertisements. Social-networking system 160 may then only provide newsfeed content or pages based on user mood or sentiment, and may not use that information for any other purpose, even if not expressly prohibited by the privacy settings.

In particular embodiments, the social-networking system 160 may temporarily access, store, or use particular objects or information associated with a user in order to facilitate particular actions of the first user, and may subsequently delete the objects or information. As an example and not by way of limitation, a first user may transmit a message to a second user, and the social-networking system 160 may temporarily store the message in a data store 164 until the second user has view or downloaded the message, at which point the social-networking system 160 may delete the message from the data store 164. As another example and not by way of limitation, continuing with the prior example, the message may be stored for a specified period of time (e.g., 2 weeks), after which point the social-networking system 160 may delete the message from the data store 164. In particular embodiments, a user may specify whether particular types of objects or information associated with the user may be accessed, stored, or used by the social-networking system 160. As an example and not by way of limitation, a user may specify that images sent by the user through the social-networking system 160 may not be stored by the social-networking system 160. As another example and not by way of limitation, a first user may specify that messages sent from the first user to a particular second user may not be stored by the social-networking system 160. As yet another example and not by way of limitation, a user may specify that all objects sent via a particular application may be saved by the social-networking system 160.

In particular embodiments, privacy settings may allow a user to specify whether particular objects or information associated with the user may be accessed from particular client systems 130 or third-party systems 170. The privacy settings may allow users to opt in or opt out of having objects or information accessed from a particular device (e.g., the phone book on a user's smart phone), from a particular application (e.g., a messaging app), or from a particular system (e.g., an email server). The social-networking system 160 may provide default privacy settings with respect to each device, system, or application, and/or the user may be prompted to specify a particular privacy setting for each context. As an example and not by way of limitation, a user may utilize a location-services feature of the social-networking system 160 to provide recommendations for restaurants or other places in proximity to the user. The user's default privacy settings may specify that the social-networking system 160 may use location information provided from a client device 130 of the user to provide the location-based services, but that the social-networking system 160 may not store the location information of the user or provide it to any third-party system 170. The user may then update the privacy settings to allow location information to be used by a third-party image-sharing application in order to geo-tag photos.

In particular embodiments, the social-networking system 160 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 160 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing particular privacy setting, a prompt may be presented to the user to remind the user of his or her current privacy settings and asking the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 160 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 160 may prompt the user with a reminder of that the user's current privacy settings of being visible only to friends, and a warning that this change will make all of the users past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 160 may send a reminder to the user to confirm his or her privacy settings every six months or after every ten photo posts. In particular embodiments, privacy settings may also allow users to control access to the objects or information on a per-request basis. As an example and not by way of limitation, the social-networking system 160 may notify the user whenever a third-party system 170 attempts to access information associated with the user, and require the user to provide verification that access should be allowed before proceeding.

Figure 16:
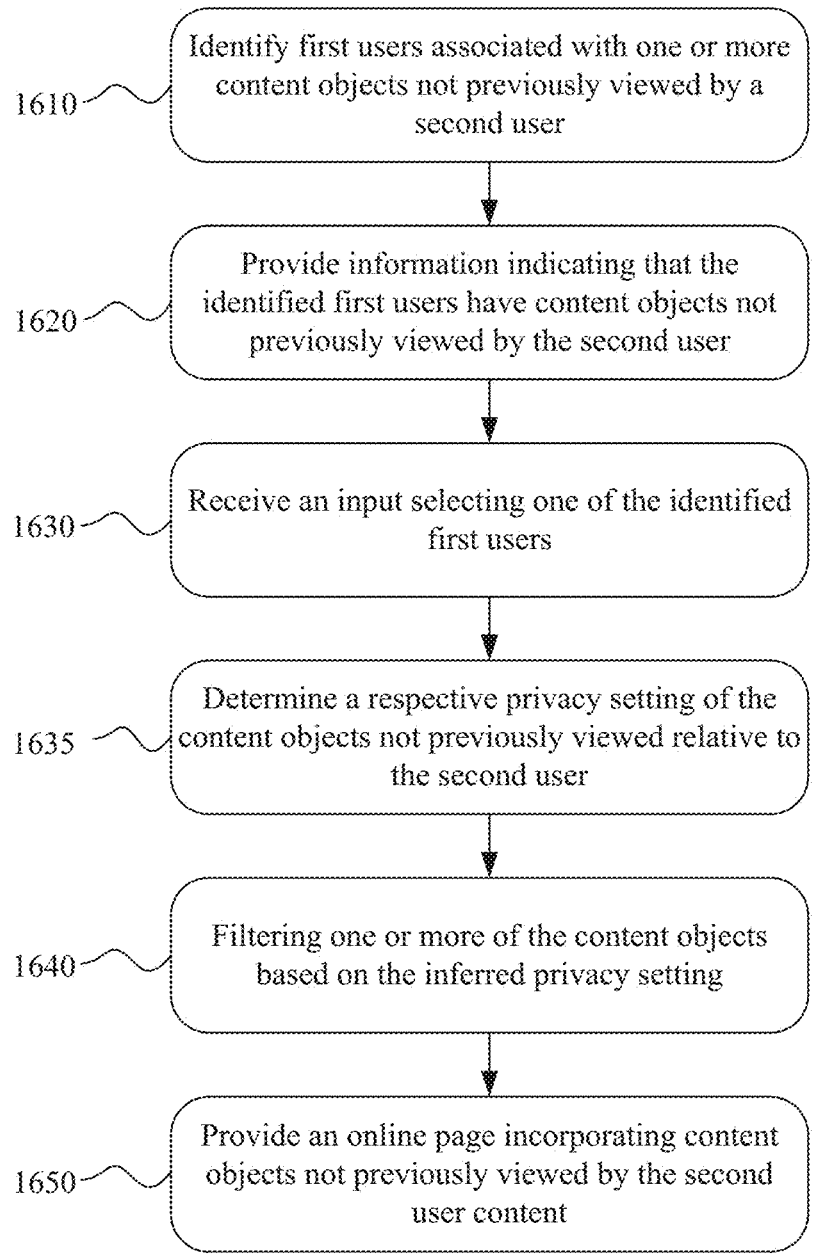
FIG. 16 illustrates an example method for providing content not previously viewed by a user.

FIG. 16 illustrates an example method 1600 for providing content not previously viewed by a user. The method may begin at step 1610, where social-networking system 160 may identify one or more first users of a social-networking system associated with one or more content objects not previously viewed by a second user. In particular embodiments, the identification is based on an affinity of the second user for the first users and the first users are connected to the second user on a social graph. At step 1620, social-networking system 160 may provide, for display on client system 130 of the second user, information indicating that one or more of the identified first users has content objects not previously viewed by the second user. At step 1630, social-networking system 160 may receive an input selecting one of the identified first users. At step 1635, social-networking system 160 may determine a respective privacy setting of one or more of the content objects not previously viewed relative to the second user. At step 1640, social-networking system 160 may filter one or more of the content objects based on the inferred privacy setting. At step 1650, social-networking system 160 may provide, for display on the client device, an online page comprising content associated with the selected first user that incorporates one or more of the content objects not previously viewed by the second user. Particular embodiments may repeat one or more steps of method 1600 of FIG. 16, where appropriate. Although this disclosure describes and illustrates particular steps of the method of FIG. 16 as occurring in a particular order, this disclosure contemplates any suitable steps of the method of FIG. 16 occurring in any suitable order. Moreover, although this disclosure describes and illustrates an example method for providing content not previously viewed by a user, including the particular steps of the method of FIG. 16, this disclosure contemplates any suitable method for providing content not previously viewed by a user including any suitable steps, which may include all, some, or none of the steps of the method of FIG. 16, where appropriate. Furthermore, although this disclosure describes and illustrates particular components, devices, or systems carrying out particular steps of the method of FIG. 16, this disclosure contemplates any suitable combination of any suitable components, devices, or systems carrying out any suitable steps of the method of FIG. 16.

Figure 17:
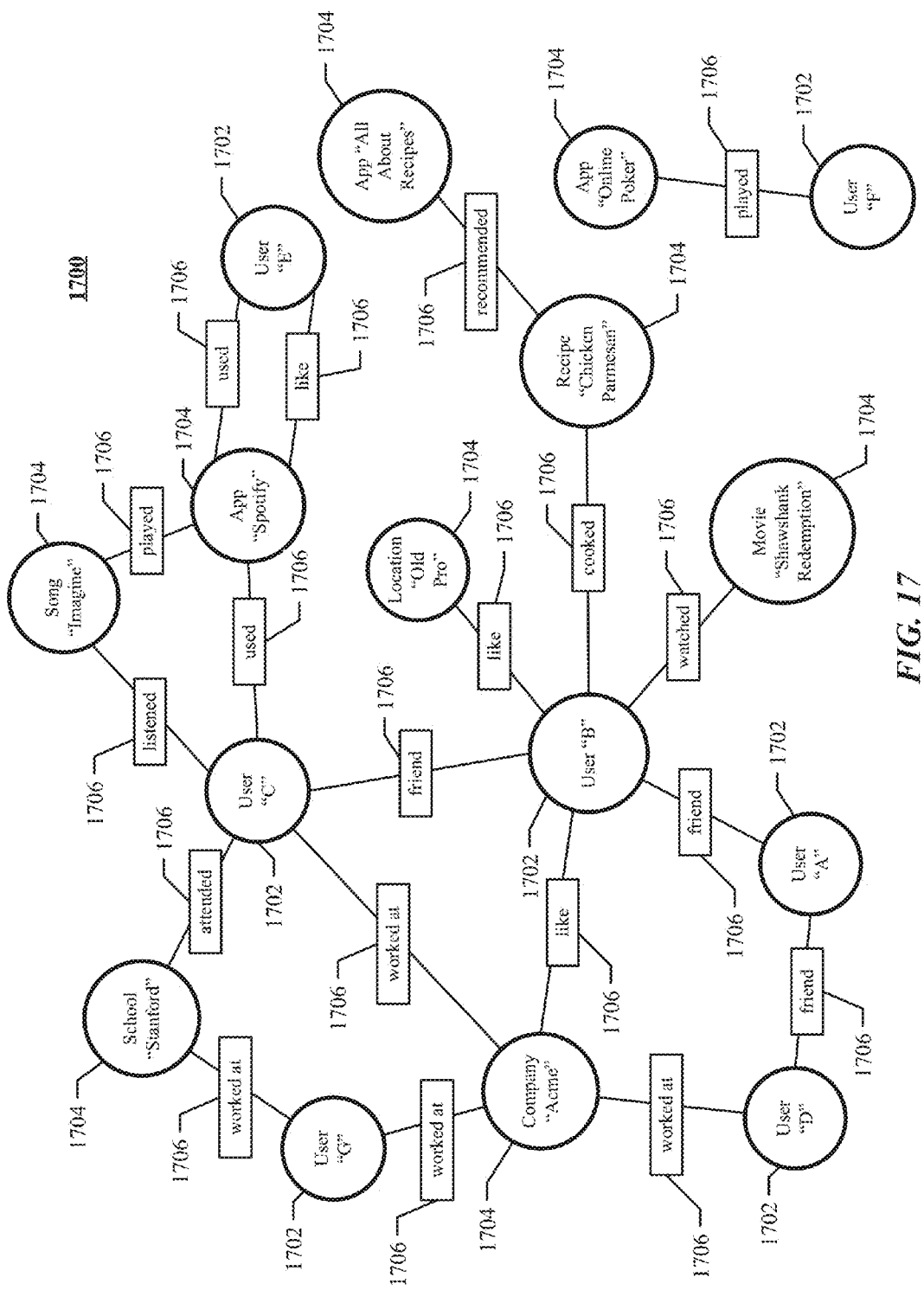
FIG. 17 illustrates an example social graph.

FIG. 17 illustrates an example social graph 1700. In particular embodiments, social-networking system 160 may store one or more social graphs 1700 in one or more data stores. In particular embodiments, social graph 1700 may include multiple nodes—which may include multiple user nodes 1702 or multiple concept nodes 1704—and multiple edges 1706 connecting the nodes. Example social graph 1700 illustrated in FIG. 17 is shown, for didactic purposes, in a two-dimensional visual map representation. In particular embodiments, social-networking system 160, client system 130, or third-party system 170 may access social graph 1700 and related social-graph information for suitable applications. The nodes and edges of social graph 1700 may be stored as data objects, for example, in a data store (such as a social-graph database). Such a data store may include one or more searchable or queryable indexes of nodes or edges of social graph 1700.

In particular embodiments, a user node 1702 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 1702 corresponding to the user, and store the user node 1702 in one or more data stores. Users and user nodes 1702 described herein may, where appropriate, refer to registered users and user nodes 1702 associated with registered users. In addition or as an alternative, users and user nodes 1702 described herein may, where appropriate, refer to users that have not registered with social-networking system 160. In particular embodiments, a user node 1702 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 1702 may be associated with one or more data objects corresponding to information associated with a user. In particular embodiments, a user node 1702 may correspond to one or more webpages.

In particular embodiments, a concept node 1704 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1704 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1704 may be associated with one or more data objects corresponding to information associated with concept node 1704. In particular embodiments, a concept node 1704 may correspond to one or more webpages.

In particular embodiments, a node in social graph 1700 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 1704. Profile pages may be viewable by all or a selected subset of other users. As an example and not by way of limitation, a user node 1702 may have a corresponding user-profile page in which the corresponding user may add content, make declarations, or otherwise express himself or herself. As another example and not by way of limitation, a concept node 1704 may have a corresponding concept-profile page in which one or more users may add content, make declarations, or express themselves, particularly in relation to the concept corresponding to concept node 1704.

In particular embodiments, a concept node 1704 may represent a third-party webpage or resource hosted by third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 130 to send to social-networking system 160 a message indicating the user's action. In response to the message, social-networking system 160 may create an edge (e.g., an "eat" edge) between a user node 1702 corresponding to the user and a concept node 1704 corresponding to the third-party webpage or resource and store edge 1706 in one or more data stores.

In particular embodiments, a pair of nodes in social graph 1700 may be connected to each other by one or more edges 1706. An edge 1706 connecting a pair of nodes may represent a relationship between the pair of nodes. In particular embodiments, an edge 1706 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 1706 connecting the first user's user node 1702 to the second user's user node 1702 in social graph 1700 and store edge 1706 as social-graph information in one or more of data stores 24. In the example of FIG. 17, social graph 1700 includes an edge 1706 indicating a friend relation between user nodes 1702 of user "A" and user "B" and an edge indicating a friend relation between user nodes 1702 of user "C" and user "B." Although this disclosure describes or illustrates particular edges 1706 with particular attributes connecting particular user nodes 1702, this disclosure contemplates any suitable edges 1706 with any suitable attributes connecting user nodes 1702. As an example and not by way of limitation, an edge 1706 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1700 by one or more edges 1706.

In particular embodiments, an edge 1706 between a user node 1702 and a concept node 1704 may represent a particular action or activity performed by a user associated with user node 1702 toward a concept associated with a concept node 1704. As an example and not by way of limitation, as illustrated in FIG. 17, a user may "like," "attended," "played," "listened," "cooked," "worked at," or "watched" a concept, each of which may correspond to a edge type or subtype. A concept-profile page corresponding to a concept node 1704 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example, a user (user "C") may listen to a particular song ("Imagine") using a particular application (SPOTIFY, which is an online music application). In this case, social-networking system 160 may create a "listened" edge 1706 and a "used" edge (as illustrated in FIG. 17) between user nodes 1702 corresponding to the user and concept nodes 1704 corresponding to the song and application to indicate that the user listened to the song and used the application. Moreover, social-networking system 160 may create a "played" edge 1706 (as illustrated in FIG. 17) between concept nodes 1704 corresponding to the song and the application to indicate that the particular song was played by the particular application. In this case, "played" edge 1706 corresponds to an action performed by an external application (SPOTIFY) on an external audio file (the song "Imagine"). Although this disclosure describes particular edges 1706 with particular attributes connecting user nodes 1702 and concept nodes 1704, this disclosure contemplates any suitable edges 1706 with any suitable attributes connecting user nodes 1702 and concept nodes 1704. Moreover, although this disclosure describes edges between a user node 1702 and a concept node 1704 representing a single relationship, this disclosure contemplates edges between a user node 1702 and a concept node 1704 representing one or more relationships. As an example and not by way of limitation, an edge 1706 may represent both that a user likes and has used at a particular concept. Alternatively, another edge 1706 may represent each type of relationship (or multiples of a single relationship) between a user node 1702 and a concept node 1704 (as illustrated in FIG. 17 between user node 1702 for user "E" and concept node 1704 for "SPOTIFY").

In particular embodiments, social-networking system 160 may create an edge 1706 between a user node 1702 and a concept node 1704 in social graph 1700. As an example and not by way of limitation, a user viewing a concept-profile page (such as, for example, by using a web browser or a special-purpose application hosted by the user's client system 130) may indicate that he or she likes the concept represented by the concept node 1704 by clicking or selecting a "Like" icon, which may cause the user's client system 130 to send to social-networking system 160 a message indicating the user's liking of the concept associated with the concept-profile page. In response to the message, social-networking system 160 may create an edge 1706 between user node 1702 associated with the user and concept node 1704, as illustrated by "like" edge 1706 between the user and concept node 1704. In particular embodiments, social-networking system 160 may store an edge 1706 in one or more data stores. In particular embodiments, an edge 1706 may be automatically formed by social-networking system 160 in response to a particular user action. As an example and not by way of limitation, if a first user uploads a picture, watches a movie, or listens to a song, an edge 1706 may be formed between user node 1702 corresponding to the first user and concept nodes 1704 corresponding to those concepts. Although this disclosure describes forming particular edges 1706 in particular manners, this disclosure contemplates forming any suitable edges 1706 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 1000, social-networking system 160 may analyze the number and/or type of edges 1106 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 18:
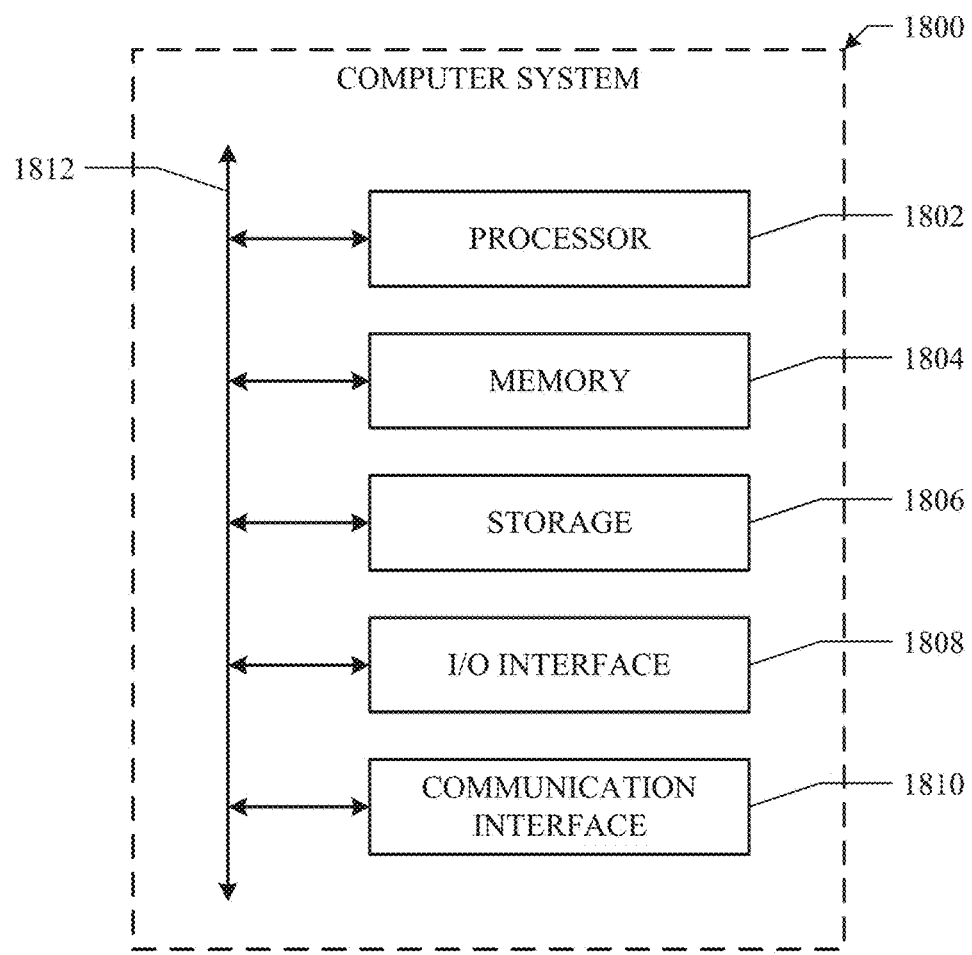
FIG. 18 illustrates an example computer system.

FIG. 18 illustrates an example computer system 1800. In particular embodiments, one or more computer systems 1800 perform one or more steps of one or more methods described or illustrated herein. In particular embodiments, one or more computer systems 1800 provide functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, and vice versa, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1800 may include one or more computer systems 1800; be unitary or distributed; span multiple locations; span multiple machines; span multiple data centers; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memories 1804, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, receiving an input corresponding to a search query from an online page of a social-networking system, wherein the online page corresponds to a target user of the social-networking system;
   by the computing device, identifying one or more of a plurality of content objects associated with the target user, wherein the association is based at least in part on analyzing text, audio, or visual content of each of the plurality of content objects as well as interactions by the target user with each of the plurality of content objects, and wherein the association is based at least in part on a relevance score of the one or more of the plurality of contents objects associated with the target user;
   by the computing device, scoring each of the identified content objects that has a corresponding relevance score that exceeds a threshold relevance score based at least in part on an affinity score of the content object relative to a querying user, wherein the affinity score is determined based on a user profile of the querying user;
   by the computing device, ranking each of the identified content objects based at least in part on the affinity score; and
   by the client computing device, sending, to a client device of the querying user in response to the received input, a search-results page comprising one or more search results for display, wherein the search results reference one or more of the ranked content objects.

2. The method of claim 1, further comprising pre-populating a list of search terms displayed in conjunction with a search field of the online page, wherein each of the search terms comprise interests, objects, people, themes, or causes for which the target user is known to have an affinity.

3. The method of claim 1, wherein each of the search results on the search-results page is displayed with an affinity score of the target user for a subject matter of the search result.

4. The method of claim 1, wherein the search results on the search-results page are sorted by an affinity score of the target user for a subject matter of the respective search result.

5. The method of claim 1, wherein each of the search results on the search-results page is displayed in accordance with privacy settings of the target user.

6. The method of claim 1, wherein each of the search results on the search-results page is displayed with an affinity score of the querying user for a subject matter of the search result.

7. The method of claim 1, wherein the search results on the search-results page are sorted by an affinity score of the querying user for a subject matter of the respective search result.

8. The method of claim 1, wherein at least one of the search results on the search-results page is displayed in conjunction with a sponsored story related to a subject matter of one of the search results.

9. The method of claim 1, wherein the search results are grouped based at least in part on a type of ranked content objects.

10. The method of claim 1, wherein the search-results page further comprises information identifying each grouping of search results.

11. The method of claim 1, wherein one or more of the content objects comprises public content associated with the target user.

12. The method of claim 11, wherein public content associated with the target user comprises a group post, article, event, photo, shared article, content object, or third-party content object.

13. The method of claim 1, wherein the interactions by the target user comprise a like, share, re-share, comment, or check-in performed by the target user.

14. The method of claim 1, wherein the online page is an online profile page of the target user.

15. The method of claim 14, wherein:
the online profile page comprises a search query field; and
the received input comprises an input selecting the search query field.

16. One or more computer-readable non-transitory storage media embodying software that is operable when executed to:
receive a search query from an online page of a social-networking system, wherein the online page corresponds to a target user of the social-networking system;
identify one or more of a plurality of content objects associated with the target user, wherein the association is based at least in part on analyzing text, audio, or visual content of each of the plurality of content objects as well as interactions by the target user with each of the plurality of content objects, and wherein the association is based at least in part on a relevance score of the one or more of the plurality of contents objects associated with the target user;
score each of the identified content objects that has a corresponding relevance score that exceeds a threshold relevance score based at least in part on an affinity score of the content object relative to a querying user, wherein the affinity score is determined based on a user profile of the querying user;
rank each of the identified content objects based at least in part on the affinity score; and
send, to a client device of the querying user in response to the received search query, a search-results page comprising one or more search results for display, wherein the search results reference one or more of the ranked content objects.

17. The media of claim 16, wherein the software is further operable to pre-populate a list of search terms displayed in conjunction with a search field of the online page, wherein each of the search terms comprise interests, objects, people, themes, or causes for which the target user is known to have an affinity.

18. The media of claim 16, wherein each of the search results on the search-results page is displayed with an affinity score of the target user for a subject matter of the search result.

19. A computing device comprising:
a processor; and
a memory coupled to the processor comprising instructions executable by the processor, the processor being operable when executing the instructions to:
receive a search query from an online page of a social-networking system, wherein the online page corresponds to a target user of the social-networking system;
identify one or more of a plurality of content objects associated with the target user, wherein the association is based at least in part on analyzing text, audio, or visual content of each of the plurality of content objects as well as interactions by the target user with each of the plurality of content objects, and wherein the association is based at least in part on a relevance score of the one or more of the plurality of contents objects associated with the target user;
score each of the identified content objects that has a corresponding relevance score that exceeds a threshold relevance score based at least in part on an affinity score of the content object relative to a querying user, wherein the affinity score is determined based on a user profile of the querying user;
rank each of the identified content objects based at least in part on the affinity score; and
send, to a client device of the querying user in response to the received search query, a search-results page comprising one or more search results for display, wherein the search results reference one or more of the ranked content objects.

20. The device of claim 19, wherein the software is further operable to pre-populate a list of search terms displayed in conjunction with a search field of the online page, wherein each of the search terms comprise interests, objects, people, themes, or causes for which the target user is known to have an affinity.

* * * * *